(12) United States Patent

Haryu et al.

(10) Patent No.: US 8,815,063 B2
(45) Date of Patent: Aug. 26, 2014

(54) HIGH-PRESSURE WATER ELECTROLYSIS APPARATUS

(75) Inventors: Eiji Haryu, Utsunomiya (JP); Koji Nakazawa, Utsunomiya (JP); Masanori Okabe, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 160 days.

(21) Appl. No.: 13/240,539

(22) Filed: Sep. 22, 2011

(65) Prior Publication Data

US 2012/0073962 A1  Mar. 29, 2012

(30) Foreign Application Priority Data

Sep. 24, 2010 (JP) .................................. 2010-214407
Aug. 2, 2011 (JP) .................................. 2011-169335

(51) Int. Cl.
*C25B 1/10* (2006.01)
*C25B 9/10* (2006.01)

(52) U.S. Cl.
USPC ........................................ 204/252; 205/629

(58) Field of Classification Search
CPC ............ C25B 1/10; C25B 9/10; C25B 13/00; C25B 13/02; C25B 1/04; C25B 1/06; C25B 1/08; C25B 1/12; H01M 8/0256; H01M 8/0202; H01M 8/0232; H01M 8/10; H01M 8/12
USPC ........... 205/629, 628; 204/252, 253, 257, 258
See application file for complete search history.

(56) References Cited

U.S. PATENT DOCUMENTS

| 5,372,689 A * | 12/1994 | Carlson et al. ................. 204/252 |
| 6,010,317 A * | 1/2000 | Maget et al. ................... 417/379 |
| 2010/0206722 A1* | 8/2010 | Haryu et al. ................... 204/252 |

FOREIGN PATENT DOCUMENTS

| JP | 2006-70322 | 3/2006 | |
| JP | 2006063419 A * | 3/2006 | ............... C25B 1/12 |

* cited by examiner

*Primary Examiner* — Nicholas A Smith
*Assistant Examiner* — Ciel Thomas
(74) *Attorney, Agent, or Firm* — Nelson Mullins Riley & Scarborough LLP; Anthony A. Laurentano (57) ABSTRACT

A high-pressure water electrolysis apparatus includes a plurality of unit cells each having an anode separator, a cathode separator, and a membrane electrode assembly which is sandwiched between the anode separator and the cathode separator. The membrane electrode assembly includes a solid polymer electrolyte membrane, and an anode current collector and a cathode current collector which are disposed respectively on opposite sides of the solid polymer electrolyte membrane. An electrically-conductive member is interposed between the cathode separator and disc springs and between a plate member and the cathode current collector so as to integrally extend from a region between the cathode separator and the disc springs to a region between the plate member and the cathode current collector. The electrically-conductive member includes an electrically-conductive path which electrically connects the cathode separator with the cathode current collector.

4 Claims, 11 Drawing Sheets

HIGH-PRESSURE WATER ELECTROLYSIS APPARATUS

CROSS-REFERENCE TO RELATED APPLICATION

This application is based upon and claims the benefit of priority from Japanese Patent Applications No. 2010-214407 filed on Sep. 24, 2010 and No. 2011-169335 filed on Aug. 2, 2011, of which the contents are incorporated herein by reference.

BACKGROUND OF THE INVENTION

1. Field of the Invention

The present invention relates to a high-pressure water electrolysis apparatus which electrically decomposes water to generate oxygen at an anode and to generate hydrogen under a pressure higher than the pressure of the oxygen at a cathode.

2. Description of the Related Art

Hydrogen gases are used as fuel gases for generating electricity with fuel cells. Generally, water electrolysis apparatus are used to generate hydrogen gases. A water electrolysis apparatus incorporates a solid polymer electrolyte membrane for electrically decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Figure 11:
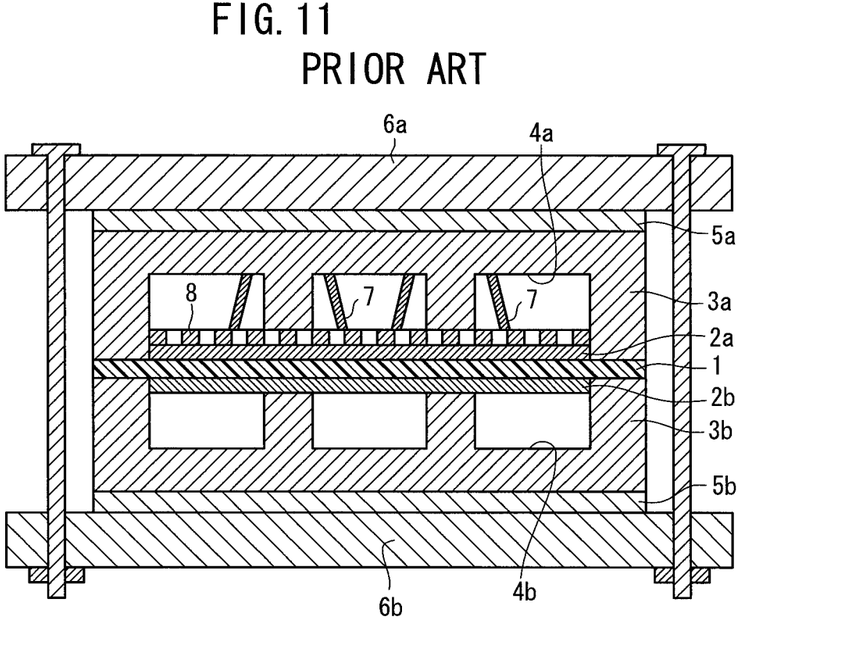
FIG. 11 is a cross-sectional view of a high-pressure hydrogen producing apparatus disclosed in Japanese Laid-Open Patent Publication No. 2006-070322.

A high-pressure water electrolysis apparatus is occasionally employed to generate hydrogen at a cathode under a pressure (e.g., several tens MPa) higher than the pressure of oxygen generated at an anode. For example, such a high-pressure hydrogen producing apparatus is disclosed in Japanese Laid-Open Patent Publication No. 2006-070322. As shown in FIG. 11 of the accompanying drawings, the disclosed high-pressure hydrogen producing apparatus includes a solid polymer membrane 1, a cathode current collector 2a and an anode current collector 2b which are disposed on respective both sides of the solid polymer membrane 1 so as to face each other, separators 3a, 3b stacked respectively on the cathode current collector 2a and the anode current collector 2b, and fluid channels 4a, 4b defined respectively in the separators 3a, 3b to expose portions of the cathode current collector 2a and the anode current collector 2b.

The solid polymer membrane 1, the cathode current collector 2a and the anode current collector 2b, and the separators 3a, 3b are sandwiched between end plates 6a, 6b with insulating members 5a, 5b stacked on the separators 3a, 3b and interposed between the separators 3a, 3b and the end plates 6a, 6b.

The fluid channels 4a defined in the separator 3a on the cathode side house therein titanium disc springs 7 which normally bias the cathode current collector 2a toward the solid polymer membrane 1. A perforated plate 8 of titanium is interposed between the disc springs 7 and the solid polymer membrane 1. Therefore, the contact resistance between the solid polymer membrane 1 and the cathode current collector 2a does not increase even when a high pressure is developed on the cathode side.

On the cathode side where high-pressure hydrogen is generated, there are stacked the disc springs 7, the perforated plate 8, and the cathode current collector 2a which are separate members.

While the high-pressure hydrogen producing apparatus is in operation, electrons flow successively through the separator 3a, the disc springs 7, the perforated plate 8, and the cathode current collector 2a, a reaction is caused to generate hydrogen on the surface of the catalyst of the solid polymer membrane 1.

The disc springs 7, which provide electrically-conductive paths, have small areas of contact with the separator 3a and the perforated plate 8. The surfaces of the disc springs 7 that are held in contact with the separator 3a and the disc springs 7 are liable to change easily, e.g., tend to have their contact resistance easily affected by oxidization. In addition, the disc springs 7 are likely to be deteriorated easily by electric currents flowing therethrough.

SUMMARY OF THE INVENTION

It is an object of the present invention to provide a high-pressure water electrolysis apparatus which includes components providing an electrically-conductive path and which is capable of effectively increasing areas of contact between the components and also making the electrically-conductive path stable without being affected by changes in the surfaces of contact between the components.

According to the present invention, there is provided a high-pressure water electrolysis apparatus including a solid polymer electrolyte membrane, an electrolysis anode current collector and an electrolysis cathode current collector which are disposed respectively on opposite sides of the solid polymer electrolyte membrane, an anode separator disposed in confronting relation to the anode current collector, for being supplied with water and electrically decomposing the water to generate oxygen, a cathode separator disposed in confronting relation to the cathode current collector, for electrically decomposing the water to generate hydrogen under a pressure higher than a pressure of the oxygen, a plate member stacked on the cathode current collector, and an elastic member disposed between the plate member and the cathode separator, for applying load in a stacking direction.

The high-pressure water electrolysis apparatus also includes an electrically-conductive member interposed between the cathode separator and the elastic member and between the plate member and the cathode current collector so as to integrally extend from a region between the cathode separator and the elastic member to a region between the plate member and the cathode current collector, wherein the electrically-conductive member includes an electrically-conductive path which electrically connects the cathode separator with the cathode current collector.

Alternatively, the high-pressure water electrolysis apparatus also includes an electrically-conductive member interposed between the cathode separator and the solid polymer electrolyte membrane and between an electrode catalyst layer of the solid polymer electrolyte membrane and the cathode current collector so as to integrally extend from a region between the cathode separator and the solid polymer electrolyte membrane to a region between the electrode catalyst layer and the cathode current collector, wherein the electrically-conductive member includes an electrically-conductive path which electrically connects the cathode separator with the electrode catalyst layer.

According to the present invention, the high-pressure water electrolysis apparatus includes an electrically-conductive member, and the electrically-conductive member includes an electrically-conductive path which electrically connects the cathode separator with the cathode current collector or with the electrode catalyst layer. Thus, the area of contact between components constituting the electrically-conductive path increases by the thickness of the electrically-conductive member. The area of contact is thus less susceptible to a change in the property of the contact surface of the electrically-conductive member. The elastic member is prevented from being deteriorated and the electrically-conductive path is rendered reliably stable regardless of changes in the contact surface of the electrically-conductive member.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
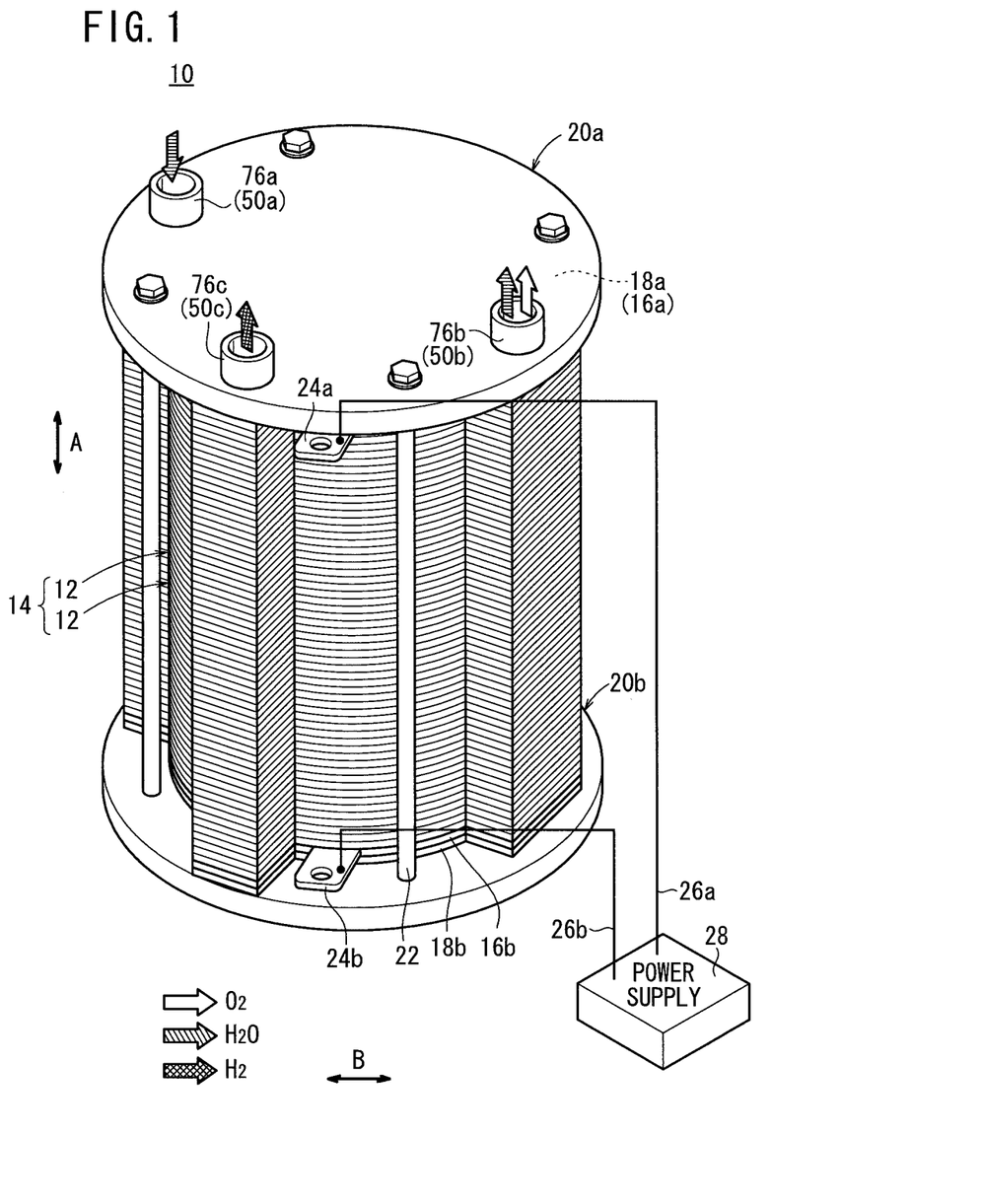
FIG. 1 is a perspective view of a high-pressure water electrolysis apparatus according to a first embodiment of the present invention.
Figure 2:
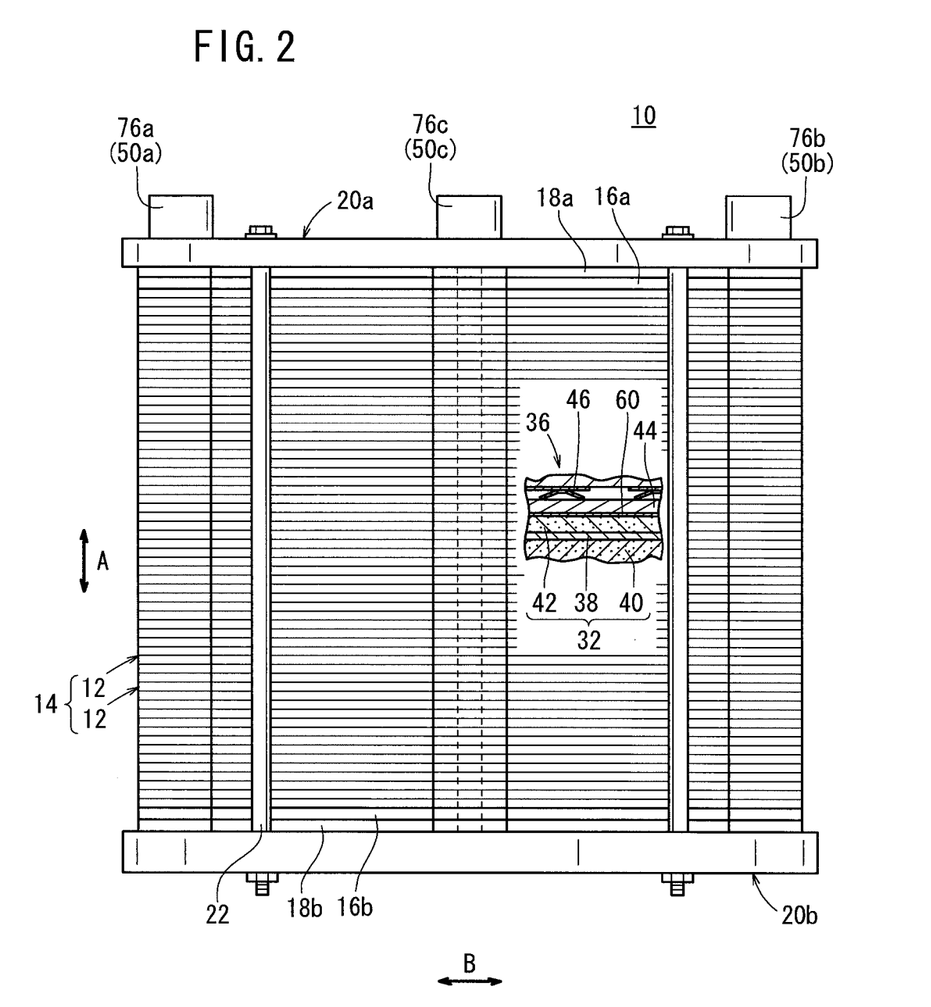
FIG. 2 is a side elevational view, partly in cross section, of the high-pressure water electrolysis apparatus shown in FIG. 1.

As shown in FIGS. 1 and 2, a high-pressure water electrolysis apparatus 10 according to a first embodiment of the present invention includes a stack assembly 14 comprising a plurality of unit cells 12 stacked in vertical directions indicated by the arrow A or horizontal directions indicated by the arrow B.

The high-pressure water electrolysis apparatus 10 also includes a terminal plate 16a, an insulating plate 18a, and an end plate 20a which are mounted on one end (upper end) of the stack assembly 14 in a successive array upwardly in the order named, and a terminal plate 16b, an insulating plate 18b, and an end plate 20b which are mounted on the other end (lower end) of the stack assembly 14 in a successive array downwardly in the order named. The unit cells 12, the terminal plates 16a, 16b, the insulating plates 18a, 18b, and the end plates 20a, 20b are of a disk shape.

The stack assembly 14, the terminal plates 16a, 16b, and the insulating plates 18a, 18b are fastened integrally together by the end plates 20a, 20b that are interconnected by four tie rods 22 extending in the directions indicated by the arrow A between the end plates 20a, 20b. Alternatively, the stack assembly 14, the terminal plates 16a, 16b, and the insulating plates 18a, 18b may be integrally held together in a box-like casing, not shown, which includes the end plates 20a, 20b as end walls. The high-pressure water electrolysis apparatus 10 is illustrated as being of a substantially cylindrical shape, though it may be of any of various shapes, e.g., a cubic shape.

As shown in FIG. 1, terminals 24a, 24b project radially outwardly from respective side edges of the terminal plates 16a, 16b. The terminals 24a, 24b are electrically connected to a power supply 28 by electric wires 26a, 26b, respectively.

Figure 3:
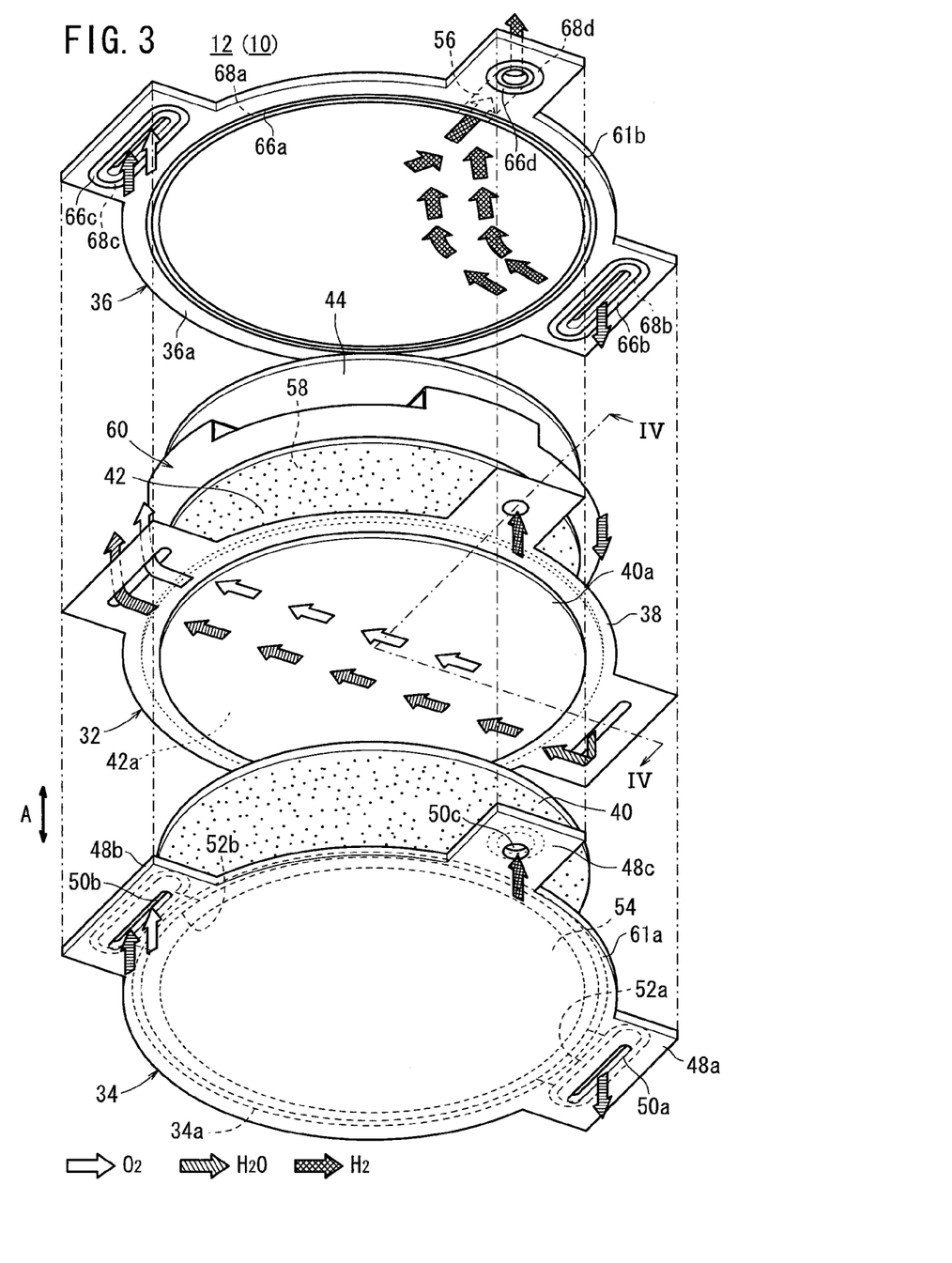
FIG. 3 is an exploded perspective view of a unit cell of the high-pressure water electrolysis apparatus.
Figure 4:
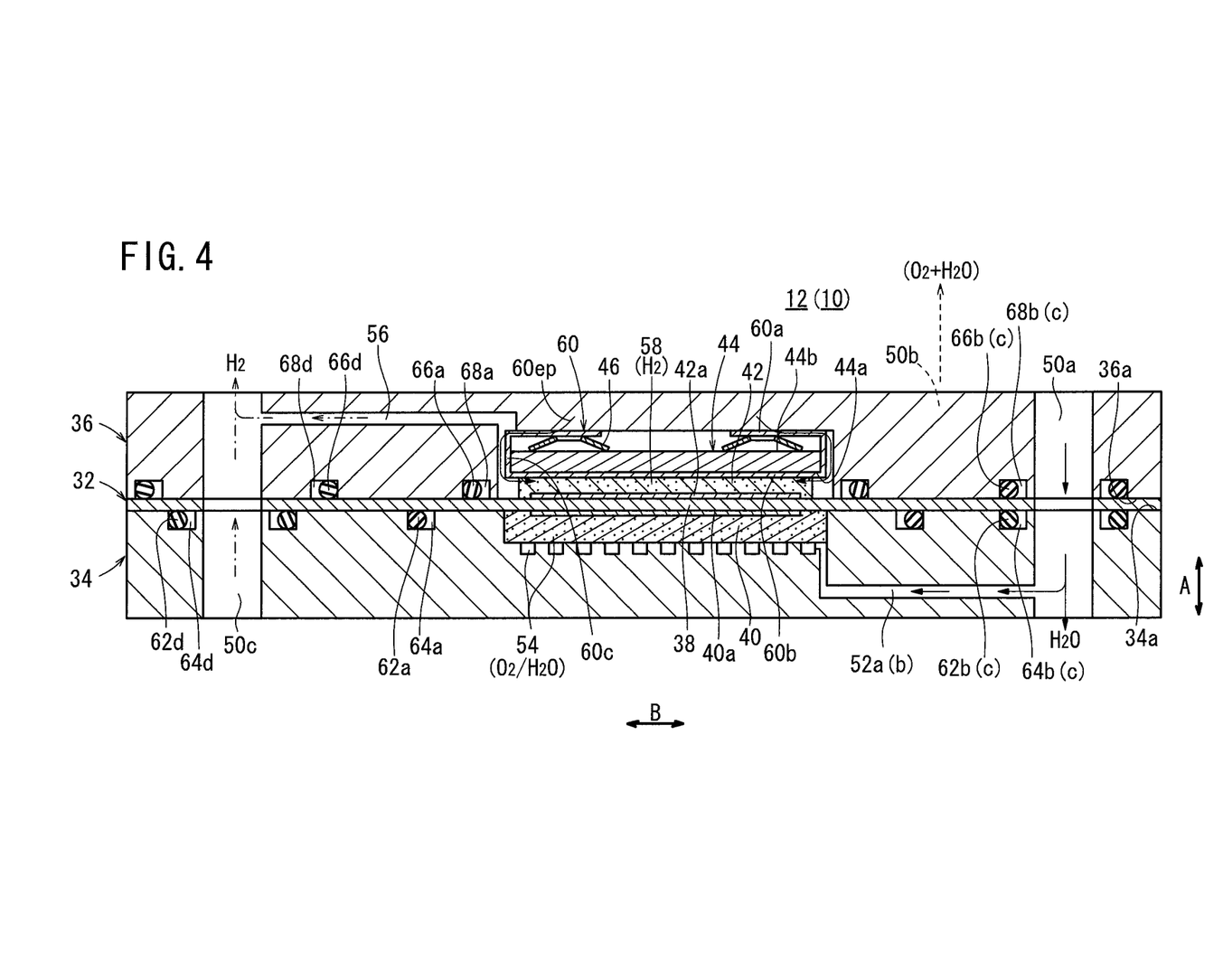
FIG. 4 is a cross-sectional view of the unit cell, taken along line IV-IV of FIG. 3.

As shown in FIGS. 3 and 4, each of the unit cells 12 comprises a substantially disk-shaped membrane electrode assembly 32, and an anode separator 34 and a cathode separator 36 which sandwich the membrane electrode assembly 32 therebetween. Each of the anode separator 34 and the cathode separator 36 is of a substantially disk shape and is in the form of a carbon plate, or in the form of a metal plate such as a steel plate, a stainless steel plate, a titanium plate, an aluminum plate, or a plated steel plate. Alternatively, each of the separators 34, 36 is formed by performing anti-corrosion treatment on the surface of such a metal plate and thereafter pressing the metal plate into shape, or by cutting the metal plate into shape and thereafter performing anti-corrosion treatment on the surface of the cut metal plate.

The membrane electrode assembly 32 has a solid polymer electrolyte membrane 38 comprising a thin membrane of perfluorosulfonic acid which is impregnated with water, and a circular anode current collector 40 and a circular cathode current collector 42 which are disposed respectively on the opposite surfaces of the solid polymer electrolyte membrane 38. The solid polymer electrolyte membrane 38 is greater in diameter than the anode current collector 40 and the cathode current collector 42 (see FIG. 3).

As shown in FIG. 4, on the opposite surfaces of the solid polymer electrolyte membrane 38, an anode catalyst layer 40a and a cathode catalyst layer 42a are formed, respectively. The anode catalyst layer 40a is made of a Ru (ruthenium)-based catalyst, for example, and the cathode catalyst layer 42a is made of a platinum catalyst, for example.

Each of the anode current collector 40 and the cathode current collector 42 is made of a sintered spherical atomized titanium powder (porous conductive material), and has a smooth surface area which is etched after it is ground. Each of the anode current collector 40 and the cathode current collector 42 has a porosity in the range of 10% to 50%, or more preferably in the range from 20% to 40%.

A plate member 44 and a plurality of disc springs (elastic members) 46 are disposed on the cathode current collector 42. The plate member 44 is in the form of a disk and includes a pressing surface 44a facing the cathode current collector 42 and a load applying surface 44b opposite to the pressing surface 44a. The elastic members, e.g., four disc springs 46, are disposed on the load applying surface 44b. The disc springs 46 apply load to the cathode current collector 42 through the plate member 44 which serves as a disc spring holder.

An electrically-conductive member 60, to be described later, is interposed between the cathode separator 36 and the disc springs 46 and between the plate member 44 and the cathode current collector 42 so as to integrally extend from a region between the cathode separator 36 and the disc springs 46 to a region between the plate member 44 and the cathode current collector 42. The electrically-conductive member 60 provides an electrically-conductive path 60ep which electrically connects the cathode separator 36 with the cathode current collector 42.

As shown in FIG. 3, each unit cell 12 has a first protrusion 48a, a second protrusion 48b, and a third protrusion 48c which project radially outwardly from its outer circumferential edge in the plane of the separators. The first protrusion 48a has a water supply passage 50a defined therein. The water supply passages 50a of the unit cells 12 are held in fluid communication with each other along the stacked directions indicated by the arrow A, and serve to supply water (pure water) as a first fluid.

The second protrusion 48b has a discharge passage 50b defined therein. The discharge passages 50b of the unit cells 12 are held in fluid communication with each other along the stacked directions indicated by the arrow A, and serve to discharge oxygen generated by an electrochemical reaction and water that has been used. The third protrusion 48c has a hydrogen passage 50c defined therein. The hydrogen passages 50c of the unit cells 12 are held in fluid communication with each other along the stacked directions indicated by the arrow A, and serve to pass high-pressure hydrogen generated by an electrochemical reaction therethrough.

As shown in FIGS. 3 and 4, the anode separator 34 has a supply channel 52a defined therein in fluid communication with the water supply passage 50a and a discharge channel 52b defined therein in fluid communication with the discharge passage 50b. The anode separator 34 also has a first flow field 54 defined in a surface 34a thereof which faces the membrane electrode assembly 32 and also in the anode current collector 40, the first flow field 54 being held in fluid communication with the supply channel 52a and the discharge channel 52b.

The cathode separator 36 has a discharge channel 56 defined therein in fluid communication with the hydrogen passage 50c. The cathode current collector 42 has a second flow field 58 defined therein, the second flow field 58 being held in fluid communication with the discharge channel 56.

Figure 5:
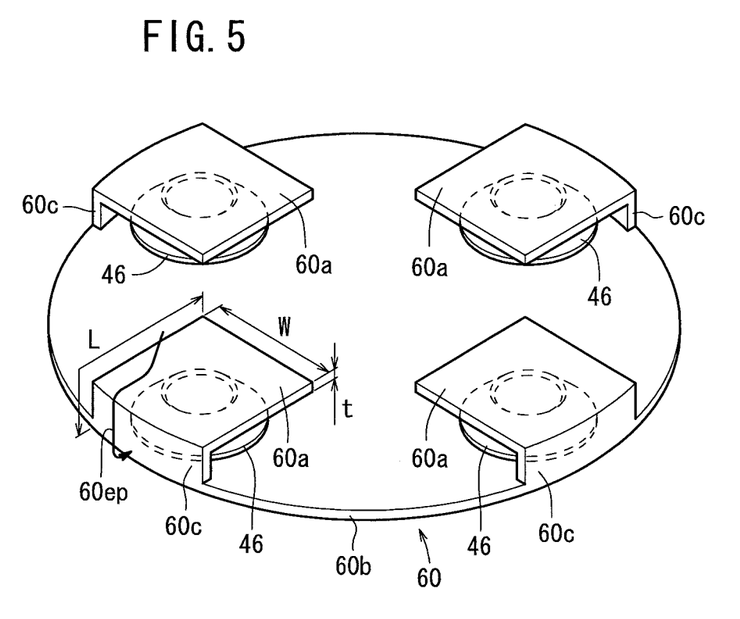
FIG. 5 is a perspective view of an electrically-conductive member of the high-pressure water electrolysis apparatus.

As shown in FIGS. 4 and 5, the electrically-conductive member 60 has four rectangular first flat portions 60a interposed between the cathode separator 36 and the disc springs 46, a disk-shaped second flat portion 60b interposed between the plate member 44 and the cathode current collector 42, and four connections 60c interconnecting the respective first flat portions 60a and the second flat portion 60b. The electrically-conductive member 60 is elastically deformable to vary the distances between the first flat portions 60a and the second flat portion 60b.

The first flat portions 60a of the electrically-conductive member 60 are integrally joined to an inner surface of the cathode separator 36 by, for example, welding or diffusion bonding. The electrically-conductive member 60 may be in the form of a metal sheet of titanium, SUS, iron, or the like, for example, and may be integrally joined to the inner surface of the cathode separator 36 by an electrically-conductive plating process using platinum.

As shown in FIG. 5, if the electrically-conductive member 60 has a resistivity R (μΩ·cm), then the resistance of the electrically-conductive path 60ep, which is in the form of a strip, is expressed as $R \times L/(4 \times W \times t)$ (μΩ) where L represents the length of the electrically-conductive path 60ep, W represents the width of the electrically-conductive path 60ep, and t represents the thickness of the electrically-conductive path 60ep. When a current A flows through the electrically-conductive path 60ep, the voltage drop developed thereacross is expressed as $RL \cdot A/4Wt$ (μV). The voltage drop is set to a value which is equal to or smaller than 1% of the overall electric power efficiency.

As shown in FIG. 3, seal members 61a, 61b are integrally combined with respective outer circumferential edge portions of the anode separator 34 and the cathode separator 36. The seal members 61a, 61b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like.

As shown in FIGS. 3 and 4, the surface 34a of the anode separator 34 which faces the membrane electrode assembly 32 has a second seal groove 64a defined therein which extends annularly around the first flow field 54 and the anode current collector 40. A second seal member 62a is disposed in the second seal groove 64a.

The surface 34a of the anode separator 34 also has a third seal groove 64b, a fourth seal groove 64c, and a fifth seal groove 64d defined therein which extend annularly around the water supply passage 50a, the discharge passage 50b, and the hydrogen passage 50c, respectively. A third seal member 62b, a fourth seal member 62c, and a fifth seal member 62d are disposed respectively in the third seal groove 64b, the fourth seal groove 64c, and the fifth seal groove 64d. The second seal member 62a, the third seal member 62b, the fourth seal member 62c, and the fifth seal member 62d are each in the form of an O-ring, for example.

The surface 36a of the cathode separator 36 which faces the membrane electrode assembly 32 has a first seal groove 68a defined therein which extends annularly around the second flow field 58 and the cathode current collector 42. A first seal member 66a is disposed in the first seal groove 68a.

The surface 36a of the cathode separator 36 also has a third seal groove 68b, a fourth seal groove 68c, and a fifth seal groove 68d defined therein which extend annularly around the water supply passage 50a, the discharge passage 50b, and the hydrogen passage 50c, respectively. A third seal member 66b, a fourth seal member 66c, and a fifth seal member 66d are disposed respectively in the third seal groove 68b, the fourth seal groove 68c, and the fifth seal groove 68d. The first seal member 66a, the third seal member 66b, the fourth seal member 66c, and the fifth seal member 66d are each in the form of an O-ring, for example.

The second seal groove 64a which extends annularly around the anode current collector 40 and the first seal groove 68a which extends annularly around the cathode current collector 42 are disposed at different positions with the solid polymer electrolyte membrane 38 interposed therebetween in the stacked directions indicated by the arrow A.

The fifth seal groove 64d which extends annularly around the hydrogen passage 50c and the fifth seal groove 68d which extends annularly around the hydrogen passage 50c are disposed at different positions with the solid polymer electrolyte membrane 38 interposed therebetween in the stacked directions indicated by the arrow A.

As shown in FIGS. 1 and 2, pipes 76a, 76b, 76c are connected to the end plate 20a in fluid communication with the water supply passage 50a, the discharge passage 50b, and the hydrogen passage 50c, respectively. A back pressure valve or a solenoid-operated valve, not shown, is connected to the pipe 76c for maintaining the pressure of hydrogen generated in the hydrogen passage 50c at a high pressure level. A pressing force is applied between the end plates 20a, 20b by a pressing force applying apparatus, not shown. While the pressing force is being applied between the end plates 20a, 20b, the end plates 20a, 20b are tightened by the tie rods 22.

Operation of the high-pressure water electrolysis apparatus 10 will be described below.

As shown in FIG. 1, water is supplied from the pipe 76a to the water supply passage 50a in the high-pressure water electrolysis apparatus 10, and a voltage is applied between the terminals 24a, 24b of the terminal plates 16a, 16b by the power supply 28 that is electrically connected thereto. As shown in FIGS. 3 and 4, in each of the unit cells 12, the water is supplied from the water supply passage 50a into the first flow field 54 of the anode separator 34 and moves in and along the anode current collector 40.

The water is electrolyzed by the anode catalyst layer 40a, generating hydrogen ions, electrons, and oxygen. The hydrogen ions generated by the anodic reaction move through the solid polymer electrolyte membrane 38 to the cathode catalyst layer 42a where they combine with the electrons to produce hydrogen.

The produced hydrogen flows along the second flow field 58 that is defined in the cathode current collector 42 and the plate member 44. The hydrogen is kept under a pressure higher than the pressure in the water supply passage 50a, and flows through the hydrogen passage 50c. Thus, the hydrogen is extracted from the high-pressure water electrolysis apparatus 10. The oxygen generated by the anodic reaction and the water that has been used flow in the first flow field 54. The oxygen and the water flow through the discharge passage 50b, and then are discharged from the high-pressure water electrolysis apparatus 10.

Figure 6:
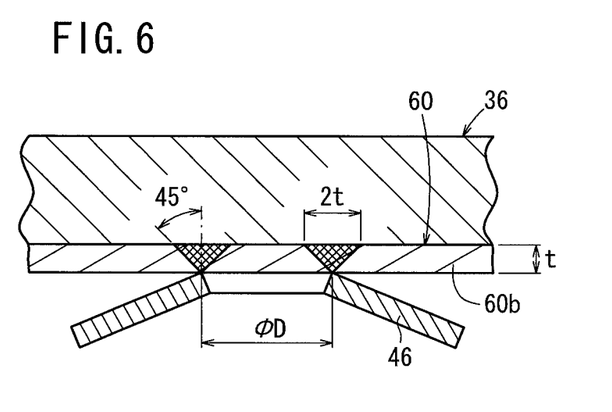
FIG. 6 is an enlarged fragmentary cross-sectional view of the electrically-conductive member which is held in contact with a cathode separator.

According to the first embodiment, each unit cell 12 includes the electrically-conductive member 60. The electrically-conductive member 60 has the electrically-conductive path 60ep which electrically connects the cathode separator 36 with the cathode current collector 42. Accordingly, as shown in FIG. 6, the area of contact between the cathode separator 36 and the disc springs 46 increases depending on the thickness t of the electrically-conductive member 60, and thus the area of contact therebetween is greater than that in a case where the cathode separator 36 and the disc springs 46 are held in direct line-to-line contact with each other. More specifically, the area of contact of the surface of the electrically-conductive member 60 to which a pressing force is applied from each of the disc springs 46 increases to $2\pi tD$.

Therefore, the area of contact can be enlarged sufficiently, and thus is less susceptible to a change in the property of the contact surface of the electrically-conductive member 60 which provides the electrically-conductive path 60ep. The disc springs 46 are prevented from being deteriorated and the electrically-conductive path 60ep is rendered reliably stable regardless of changes in the contact surface of the electrically-conductive member 60.

In the first embodiment, the second flow field 58 is defined in the cathode current collector 42. However, the present invention is not limited in this respect. For example, the second flow field 58 may be defined as linear grooves or embossed patterns in the surface of the plate member 44 which contacts the second flat portion 60b of the electrically-conductive member 60, and the second flat portion 60b of the electrically-conductive member 60 may be porous.

Figure 7:
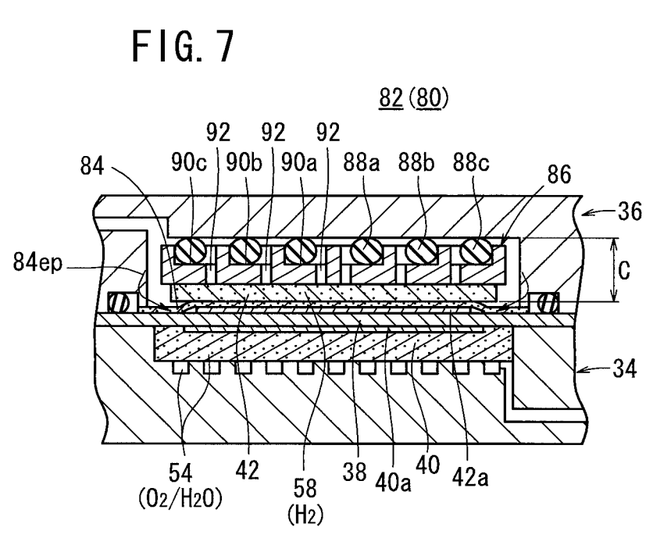
FIG. 7 is a fragmentary cross-sectional view of a unit cell of a high-pressure water electrolysis apparatus according to a second embodiment of the present invention.

FIG. 7 is a fragmentary cross-sectional view of a unit cell 82 of a high-pressure water electrolysis apparatus 80 according to a second embodiment of the present invention. Those parts of the unit cell 82 of the high-pressure water electrolysis apparatus 80 which are identical to those of the unit cell 12 of the high-pressure water electrolysis apparatus 10 according to the first embodiment are denoted by identical reference characters, and will not be described in detail below. Similarly, those parts of high-pressure water electrolysis apparatus according to other embodiments of the present invention which are identical to those of the high-pressure water electrolysis apparatus 10 according to the first embodiment are denoted by identical reference characters, and will not be described in detail below.

As shown in FIG. 7, the unit cell 82 includes an electrically-conductive member 84 interposed between the cathode catalyst layer 42a of the solid polymer electrolyte membrane 38 and the cathode current collector 42. The electrically-conductive member 84 is in the form of a circular metal thin-film sheet and has an outer circumferential edge gripped between the solid polymer electrolyte membrane 38 and the cathode separator 36. The electrically-conductive member 84 is made of a porous material having pores through which hydrogen gas and water can pass, and provides an electrically-conductive path 84ep.

Figure 8:
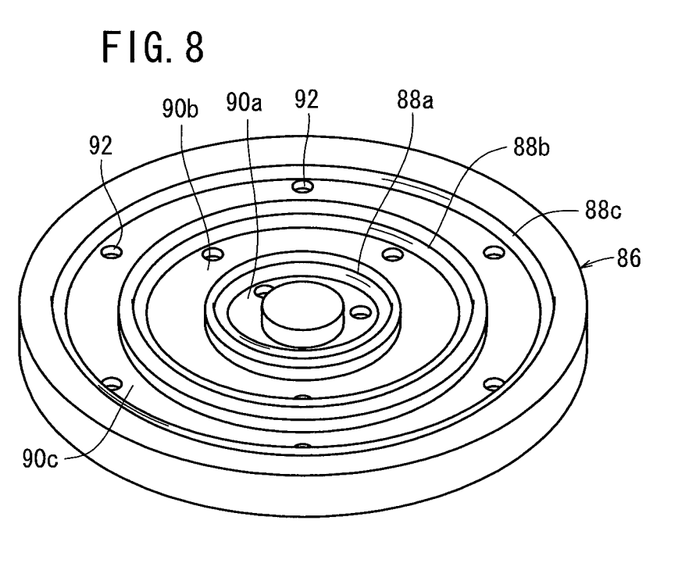
FIG. 8 is a perspective view of a plate member and a plurality of rubber members in the unit cell shown in FIG. 7.

A plate member 86 and a plurality of rubber members (elastic members) 88a, 88b, 88c are disposed on the side of the cathode current collector 42. As shown in FIGS. 7 and 8, the plate member 86 is in the form of a disk and has a plurality of concentric ring-shaped grooves 90a, 90b, 90c defined therein around the center of the plate member 86. The plate member 86 also has a plurality of hydrogen introduction holes 92 defined in the bottoms of the grooves 90a, 90b, 90c and which extend in a thicknesswise direction through the plate member 86. The rubber members 88a, 88b, 88c are disposed respectively in the grooves 90a, 90b, 90c, which project from the upper surface of the plate member 86 and abut against the inner surface of the cathode separator 36.

In the high-pressure water electrolysis apparatus 80, the electrically-conductive path 84ep is reliably stable regardless of changes in the contact surface of the electrically-conductive member 84.

Since the rubber members 88a, 88b, 88c are concentrically disposed around the center of the plate member 86, they maintain a good pressure on the contact surfaces of the cathode catalyst layer 42a and the cathode current collector 42. In addition, since the plate member 86 and the rubber members 88a, 88b, 88c are used, the thickness C of the structure including the plate member 86, the rubber members 88a, 88b, 88c, and the cathode current collector 42 is much smaller than the thickness of the structure including disc springs.

Figure 9:
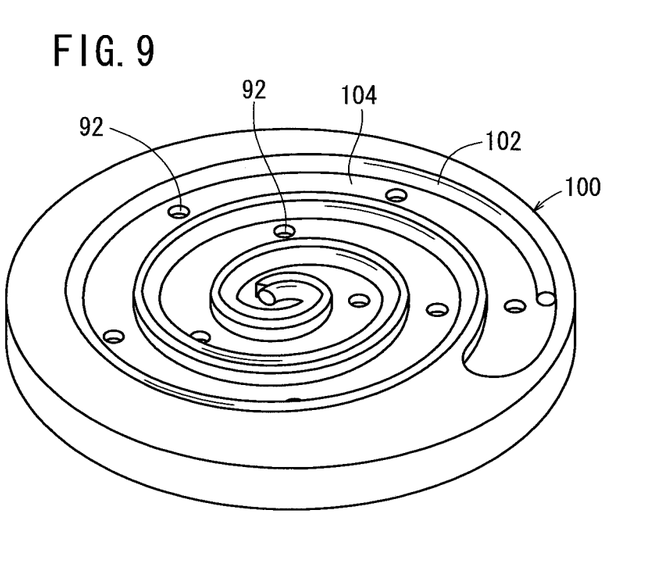
FIG. 9 is a perspective view of a plate member and a rubber member in a unit cell of a high-pressure water electrolysis apparatus according to a third embodiment of the present invention.

FIG. 9 is a perspective view of a plate member 100 and a rubber member (elastic member) 102 in a unit cell of a high-pressure water electrolysis apparatus according to a third embodiment of the present invention.

As shown in FIG. 9, the plate member 100 is in the form of a disk and has a spiral groove 104 defined therein which spirally extends radially outwardly from the center of the plate member 100. The rubber member 102 is disposed in a spiral pattern in the spiral groove 104.

Figure 10:
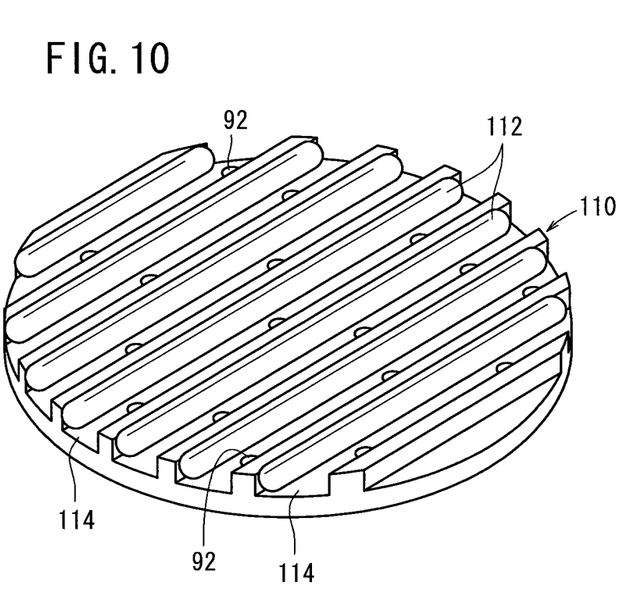
FIG. 10 is a perspective view of a plate member and a plurality of rubber members in a unit cell of a high-pressure water electrolysis apparatus according to a fourth embodiment of the present invention.

FIG. 10 is a perspective view of a plate member 110 and a plurality of rubber members (elastic members) 112 in a unit cell of a high-pressure water electrolysis apparatus according to a fourth embodiment of the present invention.

As shown in FIG. 10, the plate member 110 is in the form of a disk and has a plurality of parallel straight grooves 114 defined therein. The rubber members 112, which are straight in shape, are disposed respectively in the grooves 114.

The high-pressure water electrolysis apparatus according to the third and fourth embodiments offer the same advantages as the high-pressure water electrolysis apparatus according to the second embodiment.

Although certain preferred embodiments of the present invention have been shown and described in detail, it should be understood that various changes and modifications may be made therein without departing from the scope of the appended claims.

What is claimed is:

1. A high-pressure water electrolysis apparatus comprising:
   a solid polymer electrolyte membrane;
   an electrolysis anode current collector and an electrolysis cathode current collector which are disposed respectively on opposite sides of the solid polymer electrolyte membrane;
   an anode separator disposed face-to-face with the anode current collector, for being supplied with water and electrically decomposing the water to generate oxygen;
   a cathode separator disposed face-to-face with the cathode current collector, for electrically decomposing the water to generate hydrogen under a pressure higher than a pressure of the oxygen;
   a plate member stacked on the cathode current collector;
   an elastic member disposed between the plate member and the cathode separator, for applying load in a stacking direction; and
   an electrically-conductive member interposed between the cathode separator and the solid polymer electrolyte membrane and between an electrode catalyst layer of the solid polymer electrolyte membrane and the cathode current collector so as to integrally extend from a region between the cathode separator and the solid polymer electrolyte membrane to a region between the electrode catalyst layer and the cathode current collector, wherein the electrically-conductive member includes an electrically-conductive path which electrically connects the cathode separator with the electrode catalyst layer and an outer circumferential edge of the electrically conductive member is gripped between, and in direct face-to-face-contact with, the solid polymer electrolyte membrane and the cathode separator.

2. The high-pressure water electrolysis apparatus according to claim 1, wherein the electrically-conductive member comprises a porous metal sheet member.

3. The high-pressure water electrolysis apparatus according to claim 1, wherein the elastic member comprises a rubber member, and the plate member has a plurality of holes defined therein.

4. The high-pressure water electrolysis apparatus according to claim 3, wherein the elastic member comprises concentric elastic members, a spiral elastic member, or straight elastic members, disposed on the plate member.

* * * * *